(12) United States Patent
Masuda et al.

(10) Patent No.: US 11,086,783 B2
(45) Date of Patent: *Aug. 10, 2021

(54) DYNAMIC PREMIGRATION THROTTLING FOR TIERED STORAGE

(71) Applicant: International Business Machines Corporation, Armonk, NY (US)

(72) Inventors: Koichi Masuda, Tokyo (JP); Katja I. Denefleh, Pfungstadt (DE); Joseph M. Swingler, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,569

(22) Filed: Oct. 10, 2019

(65) Prior Publication Data
US 2020/0042457 A1   Feb. 6, 2020

Related U.S. Application Data (63) Continuation of application No. 15/711,145, filed on Sep. 21, 2017, now Pat. No. 10,528,475.

(51) Int. Cl.
*G06F 12/0871* (2016.01)
*G06F 3/06* (2006.01)
*G06F 12/0873* (2016.01)

(52) U.S. Cl.
CPC ........ *G06F 12/0871* (2013.01); *G06F 3/0604* (2013.01); *G06F 3/0607* (2013.01); *G06F 3/0647* (2013.01); *G06F 3/0685* (2013.01); *G06F 12/0873* (2013.01); *G06F 2212/213* (2013.01); *G06F 2212/224* (2013.01); *G06F 2212/604* (2013.01)

(58) Field of Classification Search
CPC .. G06F 12/0871; G06F 3/0607; G06F 3/0685; G06F 12/0873; G06F 2212/213; G06F 2212/224; G06F 2212/604
USPC .......................................................... 711/113
See application file for complete search history.

(56) References Cited

U.S. PATENT DOCUMENTS

| | | |
|---|---|---|
| 5,926,834 A | 7/1999 | Carlson et al. |
| 9,473,413 B1 | 10/2016 | Cao et al. |
| 2008/0077735 A1 | 3/2008 | Kishi et al. |
| 2008/0082856 A1 | 4/2008 | French et al. |
| 2010/0293328 A1 | 11/2010 | Kishi |
| 2016/0041758 A1* | 2/2016 | Iwasaki ................. G06F 3/0685 711/103 |
| 2019/0087342 A1 | 3/2019 | Masuda et al. |

OTHER PUBLICATIONS

IBM, "IBM TS7760", printed Jul. 10, 2017, 1 page.
(Continued)

*Primary Examiner* — Gautam Sain
(74) *Attorney, Agent, or Firm* — Donald J. O'Brien (57) ABSTRACT

A dynamic premigration protocol is implemented in response to a secondary tier returning to an operational state and an amount of data associated with a premigration queue of a primary tier exceeding a first threshold. The dynamic premigration protocol can comprise at least a temporary premigration throttling level. An original premigration protocol is implemented in response to an amount of data associated with the premigration queue decreasing below the first threshold.

20 Claims, 5 Drawing Sheets

(56) References Cited

OTHER PUBLICATIONS

IBM, "IBM Tape Storage", printed Jul. 10, 2017, 6 pages.
Nohta et al., "IBM® TS7700 Series z/OS Host Command Line Request User's Guide Version 4.1.1", IBM, IBM Systems Development, IBM Japan, Apr. 2017, 200 pages.
Fisher et al., "Understanding, Monitoring and Tuning the TS7700 Performance", IBM® Virtualization Engine TS7700 Series Best Practices, Aug. 2012, 55 pages, © Copyright IBM Corporation.
IBM, List of IBM Patents or Patent Applications Treated as Related, Oct. 10, 2019, 2 pages.

\* cited by examiner

DYNAMIC PREMIGRATION THROTTLING FOR TIERED STORAGE

BACKGROUND

The present disclosure relates to data storage systems, and, more specifically, to premigration throttling for tiered data storage systems.

SUMMARY

Aspects of the present disclosure are directed toward a method comprising, in response to a secondary tier of a hierarchical data storage system returning to an operational state from a degraded state, and further in response to a first amount of data in a premigration queue associated with a primary tier of the hierarchical data storage system exceeding a first threshold, implementing a modified premigration throttling level. The modified premigration throttling level comprises an amount of data associated with the premigration queue at which the hierarchical data storage system delays, by a delay time proportional to an amount of data associated with the premigration queue exceeding the modified premigration throttling level, respective portions of data being written to the primary tier. The method can further comprise, in response to a second amount of data associated with the premigration queue being less than the first amount of data and greater than the first threshold, implementing an updated modified premigration throttling level, where the updated modified premigration throttling level is less than the modified premigration throttling level and greater than an original premigration throttling level. The method can further comprise, in response to a third amount of data associated with the premigration queue being less than the first threshold, implementing the original premigration throttling level.

Aspects of the present disclosure are further directed toward a system comprising a data manager communicatively coupled to a first storage, a premigration queue associated with the first storage, and a second storage, the data manager comprising a processor and a computer-readable storage medium storing instructions which, when executed by the processor, cause the processor to perform a method comprising, in response to the second storage transitioning to an operational state from a non-operational state, and further in response to a first amount of data associated with the premigration queue exceeding a first threshold, implementing a modified premigration throttling level. The modified premigration throttling level comprises an amount of data associated with the premigration queue at which the data manager delays, by a delay time proportional to an amount of data associated with the premigration queue exceeding the modified premigration throttling level, respective portions of data being written to the first storage. The method can further comprise, in response to a second amount of data associated with the premigration queue of the first storage being below the first amount of data and above the first threshold, implementing a second modified premigration throttling level, where the second modified premigration throttling level is less than the modified premigration throttling level and greater than an original premigration throttling level. The method can further comprise, in response to a third amount of data associated with the premigration queue being below the first threshold, implementing the original premigration throttling level.

Aspects of the present disclosure are further directed toward a computer program product comprising a computer readable storage medium having program instructions embodied therewith. The program instructions executable by a processor to cause the processor to perform a method comprising determining a secondary tier of a hierarchical storage system is in a degraded state, where a premigration throttling level is inactive while the secondary tier is in the degraded state. The method can further comprise monitoring a premigration queue associated with data written to a primary tier of the hierarchical storage system. The method can further comprise implementing a temporary premigration throttling level in response to the secondary tier transitioning to an operational state and further in response to a first amount of data associated with the premigration queue exceeding a first threshold. The temporary premigration throttling level comprises an amount of data associated with the premigration queue of the primary tier at which the hierarchical storage system delays, by a delay time proportional to an amount of data associated with the premigration queue exceeding the temporary premigration throttling level, respective portions of data being written to the primary tier. The method can further comprise updating the temporary premigration throttling level in response to a second amount of data associated with the premigration queue being less than the first amount of data. The method can further comprise implementing an original premigration throttling level in response to a third amount of data associated with the premigration queue being less than the first threshold.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data storage systems, and, more specifically, to premigration throttling for tiered data storage systems.

A multi-tiered data storage system can include at least a primary tier configured for host writes and a secondary tier configured for archival storage. Data can be written to the primary tier and transferred from a premigration queue of the primary tier to the secondary tier according to various data storage system modes.

One example data storage system mode is host peak write mode. Host peak write mode can cause the data storage system to write data to the primary tier from a host, and the written data can be accumulated in (e.g., monitored by, summarized by, and/or organized by) a premigration queue. A data storage system can be in host peak write mode while an amount of data associated with the premigration queue is below a premigration priority level (e.g., a PMPRIOR value, or a first threshold).

Another example data storage system mode is premigration priority mode. Premigration priority mode can cause the data storage system to both write data from the host to the primary tier and transfer data from the primary tier to a secondary tier. A data storage system can be in premigration priority mode while the amount of data associated with the premigration queue is above the premigration priority level and below a premigration throttling level.

Another example data storage system mode is premigration throttling mode. Premigration throttling mode can cause the data storage system to transfer data from the premigration queue to the secondary tier and delay (e.g., throttle) respective portions (e.g., each 32 kilobyte increment) of host writes to the primary tier by a given time. In some embodiments, the given time delay of respective portions is proportional to an amount of data associated with the premigration queue exceeding a premigration throttling level. A data storage system can be in premigration throttling mode when the amount of data associated with the premigration queue is above a premigration throttling level (e.g., a PMTHLVL value, or a second threshold). The premigration throttling level can be associated with a slope defined by the premigration throttling level at zero throttling delay and a maximum amount of data allowed to be associated with the premigration queue at a maximum throttling delay. Thus, the more the amount of data associated with the premigration queue exceeds the premigration throttling level, the larger a delay will be applied to respective host writes.

The secondary tier of a data storage system can occasionally be offline or exhibit degraded functionality as a result of, for example, hardware maintenance, software maintenance, power outages, and/or connectivity disruptions. When the secondary tier is offline and/or exhibiting degraded functionality, and when the premigration queue exceeds the premigration throttling level, the data storage system can unnecessarily throttle the host writes (e.g., the excess resources such as cache and processor cycles gained by applying the premigration throttling cannot be used to increase a transfer rate of data from the primary tier to the secondary tier because the secondary tier is non-operational). To overcome this problem, a user can disable the premigration throttling level while the secondary tier is non-operational. For example, in some tiered storage systems, a user can utilize a "premigration throttling on physical library degraded" (PRETHDEG) function to render a premigration throttling level inactive while the secondary tier exhibits degraded functionality. Disadvantageously, when the secondary tier regains operational functionality, the accumulated data associated with the premigration queue can significantly exceed the premigration throttling level and cause significant throttling of host writes.

To mitigate significant host write delays upon a secondary tier of a data storage system returning to functionality, aspects of the present disclosure are directed toward a dynamic premigration protocol (also referred to herein as a modified premigration protocol, a temporary premigration protocol, and/or an updated premigration protocol). The dynamic premigration protocol can include at least one of a dynamic premigration priority level, a dynamic premigration throttling level, a dynamic maximum amount of data associated with the premigration queue, and a dynamic premigration throttling slope.

Advantageously, aspects of the present disclosure can reduce host write delays to a primary tier in response to a secondary tier of a data storage system returning to an operational state from a non-operational (or degraded) state by implementing a dynamic premigration protocol that modifies aspects of the original premigration protocol. In addition, aspects of the present disclosure advantageously update the modified premigration protocol as the amount of data associated with the premigration queue changes. Thus, the modified premigration protocol can incrementally return to the original premigration protocol as data associated with the premigration queue decreases. The aforementioned advantages are example advantages, and embodiments of the present disclosure exist that can realize all, some, or none of the aforementioned advantages.

Figure 1:
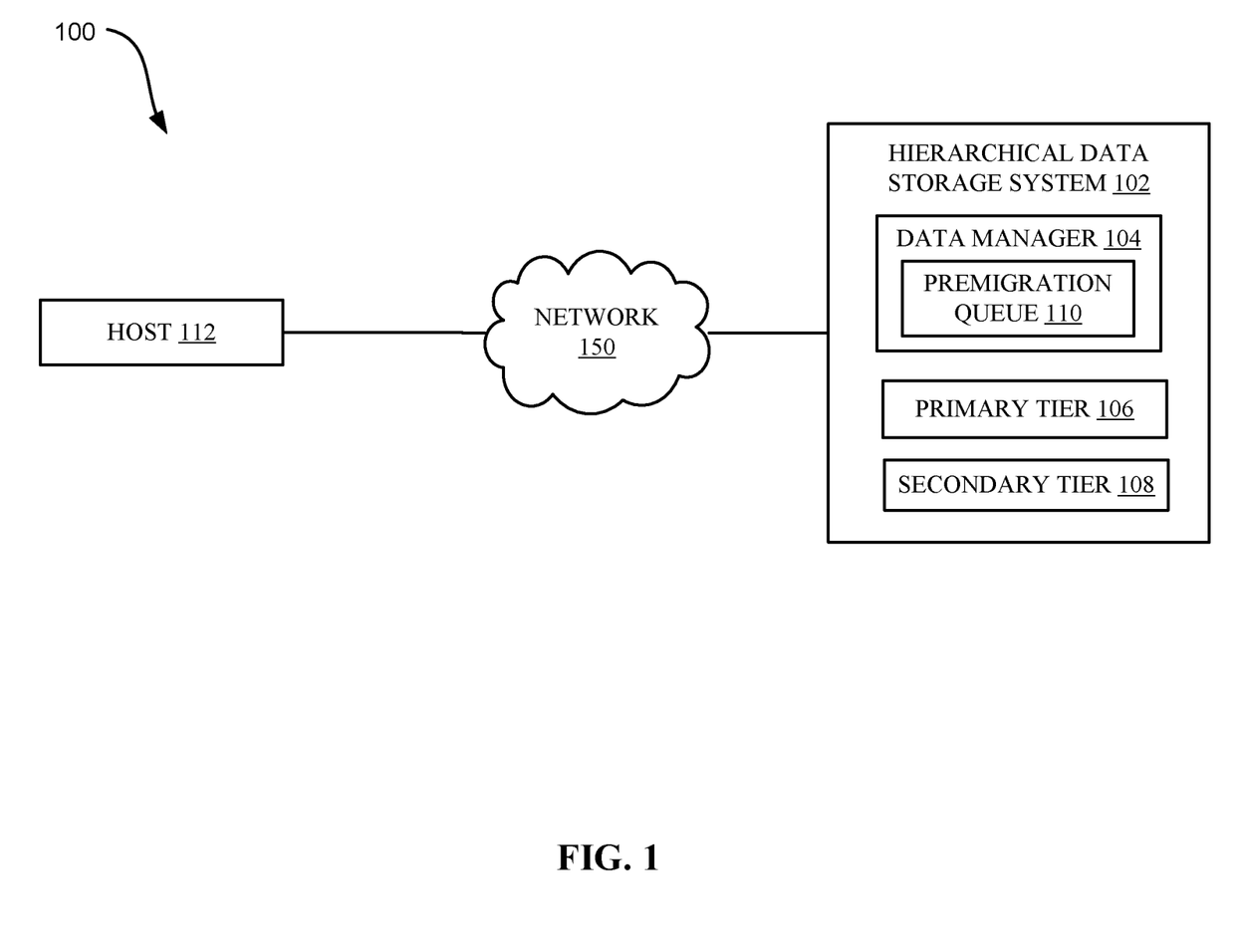
FIG. 1 illustrates a block diagram of an example data storage environment in accordance with some embodiments of the present disclosure.

FIG. 1 illustrates a data storage environment 100 in accordance with some embodiments of the present disclosure. Data storage environment 100 includes a hierarchical data storage system 102 comprising a data manager 104, a primary tier 106, and a secondary tier 108. The hierarchical data storage system 102 is communicatively coupled to a host 112 via a physical or virtual network 150.

Although a single hierarchical data storage system 102 is shown, in some embodiments multiple data storage systems are communicatively coupled via network 150 or a different network. Furthermore, although a primary tier 106 and secondary tier 108 are shown, any number of tiers can reside within hierarchical data storage system 102. Furthermore, although data manager 104, primary tier 106, and secondary tier 108 are shown physically integrated within hierarchical data storage system 102, the data manager 104, primary tier 106, and secondary tier 108 can alternatively be distant from one another and communicatively coupled by a network such as network 150. In some embodiments, hierarchical data storage system 102 is an International Business Machines Corporation (IBM) TS7700 enterprise storage system. However, it is to be understood that the hierarchical data storage system 102 can be implemented using other storage systems, in other embodiments.

Primary tier 106 can receive data from host 112. For example, primary tier 106 can receive host writes from host 112. In some embodiments, primary tier 106 comprises a disk subsystem. As understood by one of skill in the art, a disk subsystem can include one or more hard-disk drives, one or more solid-state drives, or a combination of hard-disk drives and solid-state drives. In some embodiments, primary tier 106 is a virtualized storage system. In some embodiments, primary tier 106 is an external storage system (e.g., an external, network-based storage system).

Primary tier 106 can be communicatively coupled to a premigration queue 110 that stores accumulated host writes ready for migration to secondary tier 108. In some embodiments, premigration queue 110 can comprise an ordered list of volumes moved from (or configured to be moved from) primary tier 106 to secondary tier 108. Although the present disclosure may discuss data stored in premigration queue 110, in some embodiments, premigration queue 110 only stores identification of volumes of data stored in primary tier 106 and ready for migration to secondary tier 108. Thus, references to amounts of data in premigration queue 110 can mean amounts of data associated with premigration queue 110, where the associated data can comprise volumes/amounts of data residing in primary tier 106 and ready for migration to secondary tier 108.

The premigration queue 110 can be associated with a premigration priority level (e.g., PMPRIOR), a premigration throttling level (e.g., PMTHLVL), a maximum throttling level, a maximum premigration queue size, and a premigration throttling slope.

The premigration priority level can be an amount of data associated with the premigration queue 110 at which the data manager 104 transitions from host peak write mode to premigration priority mode. The premigration priority level can be configured in gigabyte (GB) increments. For example, the premigration priority level can be 1600 GB.

The premigration throttling level can be an amount of data associated with the premigration queue 110 at which the data manager 104 transitions from a premigration priority mode to a premigration throttling mode. The premigration throttling level can be configured in GB increments. For example, the premigration throttling level can be 2000 GB.

The maximum throttling level can be a maximum time delay for each increment of data being written to the primary tier 106. For example, the maximum throttling level can be a maximum amount of time to delay each 32 KB increment of data being written to the primary tier 106 from host 112.

The maximum premigration queue size can be a maximum amount of data allowed to be associated with the premigration queue. In embodiments where the hierarchical data storage system 102 is an IBM TS7700 data storage system, the maximum premigration queue size can be defined by feature code (FC) 5274 where each configured FC5274 can correspond to, for example one terabyte (TB) of premigration queue capacity.

Secondary tier 108 can receive data transferred from primary tier 106 and archive the transferred data. In some embodiments, secondary tier 108 comprises a tape storage system. As understood by one of skill in the art, a tape storage system can include one or more tape drives that read and write data on a magnetic tape. In some embodiments, secondary tier 108 comprises a virtualized tape storage system. In some embodiments, secondary tier 108 comprises external storage (e.g., an external, network-based storage). In some embodiments, secondary tier 108 exhibits decreased write speed relative to primary tier 106. In some embodiments, the secondary tier 108 exhibits increased storage capacity relative to primary tier 106. In some embodiments, the secondary tier 108 exhibits a decreased cost per unit of storage relative to the primary tier 106. In some embodiments, primary tier 106 differs from secondary tier 108 by a performance metric in at least one of speed, storage, cost, compatibility, and security.

Host 112 can be, for example, a computer, a laptop, a desktop, a server, a user device, or a different data processing system capable of sending data for storage in the primary tier 106 via the network 150.

Data manager 104 is configured to manage data received from host 112 by the primary tier 106 and subsequently transferred to the secondary tier 108 based on information stored in premigration queue 110. In some embodiments, data manager 104 generates a modified premigration protocol comprising at least one of a modified premigration priority level, a modified premigration throttling level, a modified maximum amount of data associated with the premigration queue, and/or a modified premigration throttling slope in response to the secondary tier 108 returning from a degraded state and the premigration queue 110 exceeding a first threshold (e.g., the original premigration priority level). Example functionality of data manager 104 is described in more detail hereinafter with respect to FIGS. 2-4, and an example structure of data manager 104 is described in further detail hereinafter with respect to FIG. 5.

Although hierarchical data storage system 102 is shown as a single, physical entity, in some embodiments, hierarchical data storage system 102 can be fully or partially virtualized such that at least a portion of the resources associated with hierarchical data storage system 102 are distributed amongst multiple nodes and configured to function similar to a single node or a co-located set of nodes. Furthermore, some aspects of the storage can be a first type of storage configured to function in a similar manner as a second type of storage (e.g., virtualized tape storage).

Figure 2:
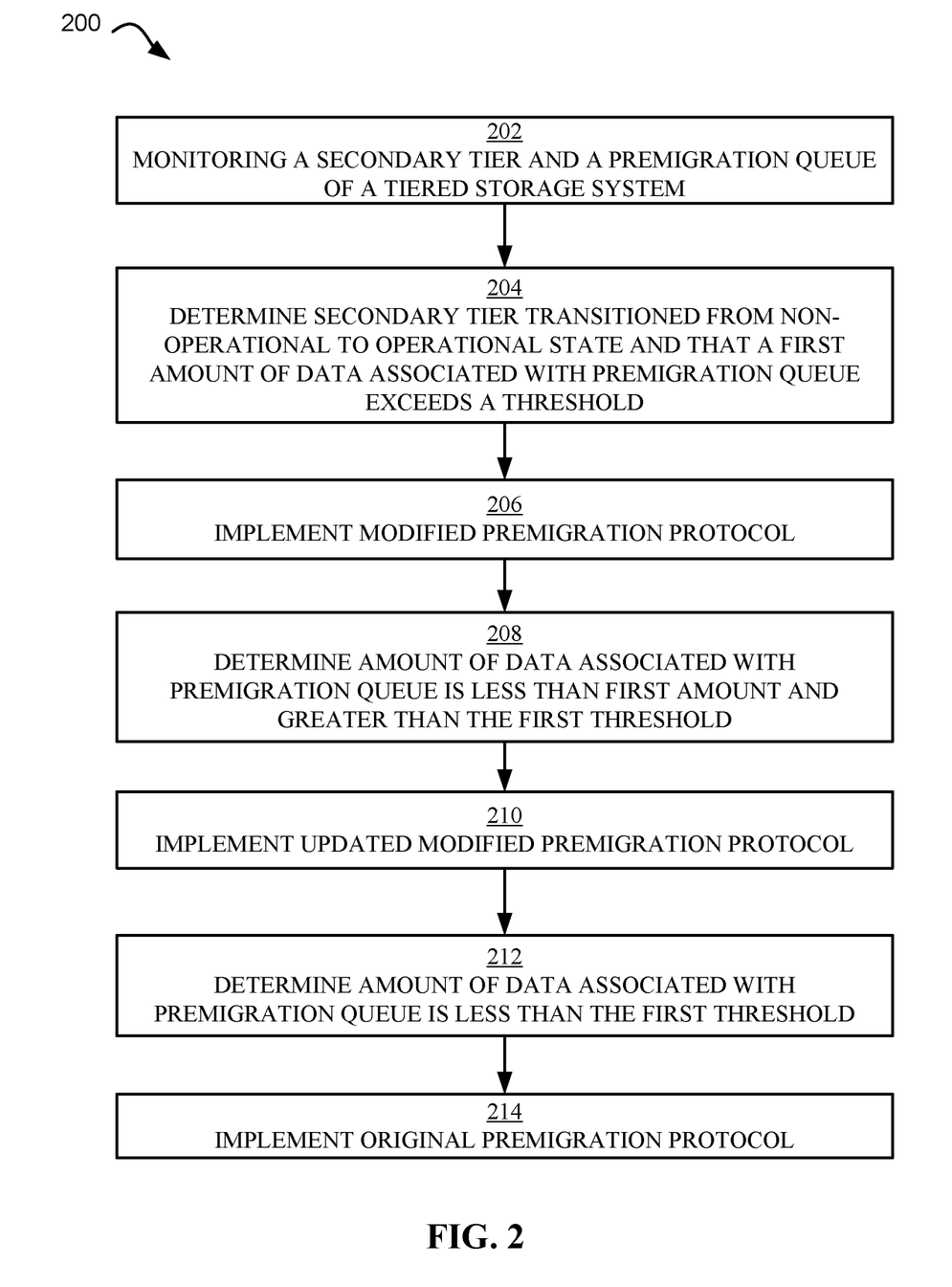
FIG. 2 illustrates a flowchart of an example method for implementing a modified premigration protocol in accordance with some embodiments of the present disclosure.

FIG. 2 illustrates a flowchart of an example method for implementing a modified premigration protocol in accordance with some embodiments of the present disclosure. In some embodiments, the method 200 is performed by a processor executing computer-readable instructions. In some embodiments, the method 200 is performed by a data manager such as data manager 104 of FIG. 1. For clarity, the method 200 will be described as being performed by a data manager, however, the method 200 can likewise be executed by alternative configurations of one or more hardware components.

In operation 202, the data manager monitors a secondary tier of a tiered data storage system and a premigration queue associated with a primary tier of the tiered storage system. In some embodiments, the secondary tier is consistent with secondary tier 108 of FIG. 1, the primary tier is consistent with primary tier 106 of FIG. 1, and the premigration queue is consistent with premigration queue 110 of FIG. 1.

In operation 204, the data manager determines the secondary tier transitions from a degraded state (e.g., a non-operational state, or a state of decreased functionality) to an operational state. The secondary tier can be in a degraded state, for example, while hardware and/or software is repaired, upgraded, replaced, or otherwise maintained. In other examples, the secondary tier can be in a degraded state if power is lost to the secondary tier, or communication between the primary tier and the secondary tier, or between the data manager and the secondary tier, is limited or disconnected.

In operation 204, the data manager can further determine an amount of data associated with the premigration queue exceeds a first threshold. In some embodiments, the first threshold is an original premigration priority level.

In operation 206, the data manager implements a modified premigration protocol. In some embodiments, a modified premigration protocol comprises at least one of a modified premigration throttling level, a modified premigration throttling slope, a modified maximum amount of data associated with the premigration queue, and a modified premigration priority level. The modified premigration protocol is described in more detail hereinafter.

In operation 208, the data manager determines an amount of data associated with the premigration queue is less than the first amount of data and greater than the first threshold. The data manager can review the amount of data associated with the premigration queue every time interval. For example, the data manager can review the amount of data associated with the premigration queue every five, ten, twenty, thirty, or sixty seconds. In some embodiments, the time interval can be at most five, ten, twenty, thirty, or sixty seconds. In some embodiments, the time interval can be at least five, ten, twenty, thirty, or sixty seconds.

In operation 210, the data manager implements an updated modified premigration protocol. The updated modified premigration protocol can comprise at least one of an updated modified premigration throttling level, an updated modified premigration throttling slope, an updated modified maximum amount of data associated with the premigration queue, and an updated modified premigration priority level. Aspects of the updated modified premigration protocol can decrease in value relative to the modified premigration protocol. For example, an updated modified premigration throttling level can be less than the modified premigration throttling level, both of which can be greater than the original premigration throttling level.

In operation 212, the data manager can determine the amount of data associated with the premigration queue is less than the first threshold. In some embodiments, the first threshold is the original premigration priority level.

In operation 214, the data manager can implement the original premigration protocol in response to the amount of data associated with the premigration queue being less than the first threshold. The original premigration protocol can comprise at least one of an original premigration throttling level, an original premigration throttling slope, an original maximum amount of data associated with the premigration queue, and an original premigration priority level.

Figure 3:
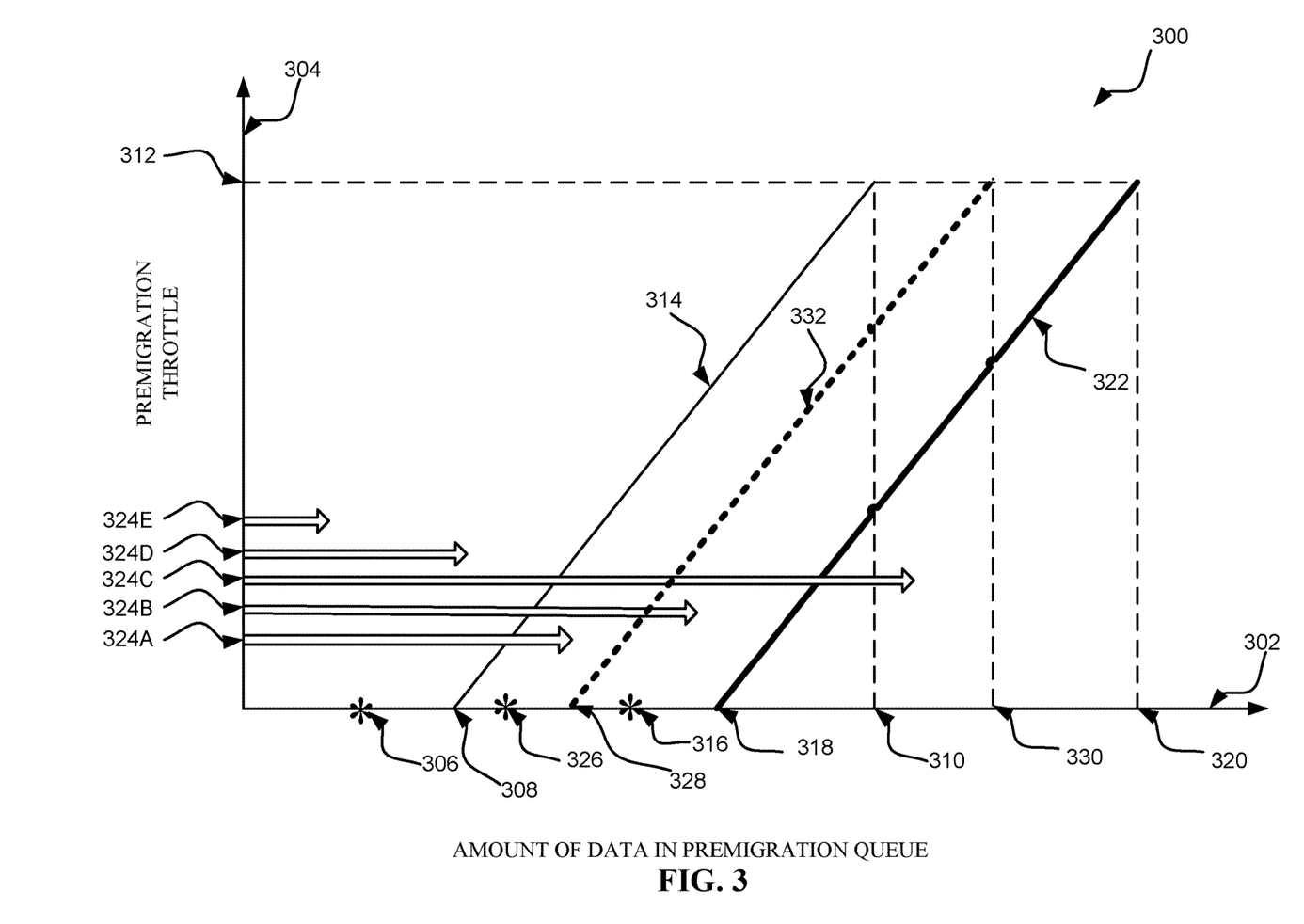
FIG. 3 illustrates an example premigration protocol graph in accordance with some embodiments of the present disclosure.

FIG. 3 illustrates a graph of an example original, temporary, and updated premigration protocol in accordance with some embodiments of the present disclosure. Premigration protocol graph 300 is presented for illustrative purposes and is not necessarily drawn to scale. Embodiments of the present disclosure exist with similar and/or dissimilar points, lines, distances, and angles than those illustrated in premigration protocol graph 300.

Premigration protocol graph 300 can include x-axis 302 indicating an amount of data in a premigration queue (e.g., premigration queue 110 of FIG. 1). In some embodiments, x-axis 302 is measured in bytes. Premigration protocol graph 300 further comprises y-axis 304 indicating a premigration throttling level. Y-axis 304 can indicate a delay per host write size. For example, y-axis 304 can be measured in milliseconds delay per 32 KB portion of a host write.

Premigration protocol graph 300 can further comprise an automatically defined or manually configured original premigration priority level (PMPRIOR) 306 indicating an amount of data associated with the premigration queue at which the data storage system transitions from a host peak write mode to a premigration priority mode. Premigration priority level 306 can be measured in gigabytes (GB) of unpremigrated data. For example, premigration priority level 306 can be 1600 GB. When the premigration queue exceeds the premigration priority threshold, the data manager can begin increasing the number of premigration tasks allowed to compete with host input/output (I/O) operations for computational resources such as cache and processor cycles.

Premigration protocol graph 300 can further comprise an automatically defined or manually configured premigration throttling (PMTHLVL) level 308 indicating an amount of data associated with the premigration queue at which the data storage system transitions from the premigration priority mode to a premigration throttling mode. An amount of premigration throttling (indicated by the y-axis 304) can be defined by the original premigration throttling slope 314 which is defined by the original premigration throttling level 308, an automatically defined or manually configured maximum premigration throttling level 312, and an automatically defined or manually configured original maximum amount of data associated with the premigration queue 310. In some embodiments, original premigration throttling slope 314 is defined as a slope between a point defined by the original premigration throttling level 308 on the x-axis 302 and zero on the y-axis 304 and another point defined by the original maximum amount of data associated with the premigration queue 310 on the x-axis 302 and the maximum premigration throttling level 312 on the y-axis 304. In some embodiments, the original maximum amount of data associated with the premigration queue 310 can be configured by feature code (FC) 5274 of the tiered data storage system utilizing premigration protocol graph 300 (e.g., each enabled FC 5274 can allow 1 terabyte (TB) of data to reside in the premigration queue).

In accordance with some embodiments of the present disclosure, a temporary premigration protocol can be implemented in response to a secondary tier of the storage system returning from a degraded state and an amount of premigration data associated with the premigration queue exceeding a first threshold (e.g., the first threshold can be an original premigration priority level 306 or an original premigration throttling level 308). The temporary premigration protocol can comprise at least one of a temporary premigration priority level (PMPR_TMP) 316, a temporary premigration throttling level (PMTH_TMP) 318, a temporary premigration throttling slope 322, and a temporary maximum amount of data associated with the premigration queue 320.

In some embodiments, the temporary premigration priority level 316 can be the sum of the original premigration priority level 306 and an amount of data queued while the secondary tier was in a degraded state. In some embodiments, the temporary premigration priority level 316 can be the sum of the original premigration priority level 306 and the amount of data currently in the premigration queue. In some embodiments, the temporary premigration priority level 316 can be the sum of the original premigration priority level 306 and the lesser of the amount of data queued while the secondary tier was in a degraded state and the amount of data currently in the premigration queue.

In some embodiments, the temporary premigration throttling level 318 can be the sum of the original premigration throttling level 308 plus an amount of data queued while the secondary tier was in the degraded state. In some embodiments, the temporary premigration throttling level 318 can be the sum of the original premigration throttling level 308 plus an amount of data currently in the premigration queue. In some embodiments, the temporary premigration throttling level 318 can be the sum of the original premigration throttling level 308 plus the lesser of an amount of data queued while the secondary tier was in a degraded state and the amount of data currently in the premigration queue.

In some embodiments, the temporary premigration throttling slope can be a slope defined by a first point at the temporary premigration throttling level 318 and zero on the y-axis 304 and a second point at a temporary maximum amount of data associated with the premigration queue 320 on the x-axis 302 and the maximum premigration throttling level 312 on the y-axis 304. In some embodiments, the temporary maximum amount of data associated with the premigration queue 320 is the result of the temporary premigration throttling level 318 plus the original maximum amount of data associated with the premigration queue 310 minus the original premigration throttling level 308. In other words, the temporary maximum amount of data associated with the premigration queue 320 can be the sum of the original maximum amount of data associated with the premigration queue 310 and a difference between the temporary premigration throttling level 318 and the original premigration throttling level 308.

In some embodiments, temporary premigration priority level 316 and temporary premigration throttling level 318 will be maximized in the first iteration of calculations upon return of the secondary tier to a fully operational status. Thus, as the data manager iterates through temporary premigration protocols (e.g., described in further detail hereinafter with respect to FIG. 4), only those updated temporary premigration protocols (such as updated temporary premigration priority level 326, updated temporary premigration throttling level 328, updated temporary premigration throttling slope 332, and updated temporary maximum amount of data associated with the premigration queue 330) having decreased values relative to the currently implemented values will be applied. Such a configuration enables a growing premigration queue to be downsized by throttling host writes if the premigration queue continues to grow after implementing the temporary premigration protocol when the secondary tier returns to a fully operational state.

An example of aspects of the present disclosure will now be described with reference to various amounts of data in premigration queue 324A-324E. The first amount of data in premigration queue 324A can exceed a first threshold (e.g., original premigration priority level 306) after a secondary tier returns to functionality. In response, the data manager implements a temporary premigration protocol comprising at least one of a temporary premigration priority level 316, a temporary premigration throttling level 318, a temporary premigration throttling slope 322, and a temporary maximum amount of data in premigration queue 320.

Since the temporary premigration priority level 316 is larger than the first amount of data associated with the premigration queue 324A, the data manager can function in host peak write mode.

In some cases, data can continue to be written to the primary tier. This can create a second amount of data associated with the premigration queue 324B. Second amount of data 324B can exceed the temporary premigration priority level 316, and the data manager can transition to premigration priority mode.

In some cases, data can continue to be written to the primary tier and a third amount of data associated with the premigration queue 324C can exceed the temporary premigration throttling level 318. In response, the data manager can transition to premigration throttling mode and throttle the host writes by an amount determined by the temporary premigration throttling slope 322.

In some embodiments, a fourth amount of data associated with the premigration queue 324D can be reduced below the temporary premigration priority level 316 but above the original premigration priority level 306. In response, the data manager can implement an updated temporary premigration protocol including at least one of an updated temporary premigration priority level 326, an updated temporary premigration throttling level 328, an updated temporary premigration throttling slope 332, and an updated temporary maximum amount of data associated with the premigration queue 330.

In some embodiments, a fifth amount of data associated with the premigration queue 324E can be less than an original premigration priority level 306. In response, the data manager can implement an original premigration protocol comprising at least one of the original premigration priority level 306, the original premigration throttling level 308, the original premigration throttling slope 314, and the original maximum amount of data associated with the premigration queue 310.

Although only one updated temporary premigration protocol is shown, any number of updated temporary premigration protocols are possible. In some embodiments, each subsequent updated temporary premigration protocol is to the left of the previous temporary premigration protocol in the premigration protocol graph 300 (e.g., each subsequent premigration protocol has decreasing values approaching the original premigration protocol).

Although only one original maximum premigration throttling level 312 is shown, some embodiments include a modified maximum premigration throttling level and one or more updated modified premigration throttling levels.

Figure 4:
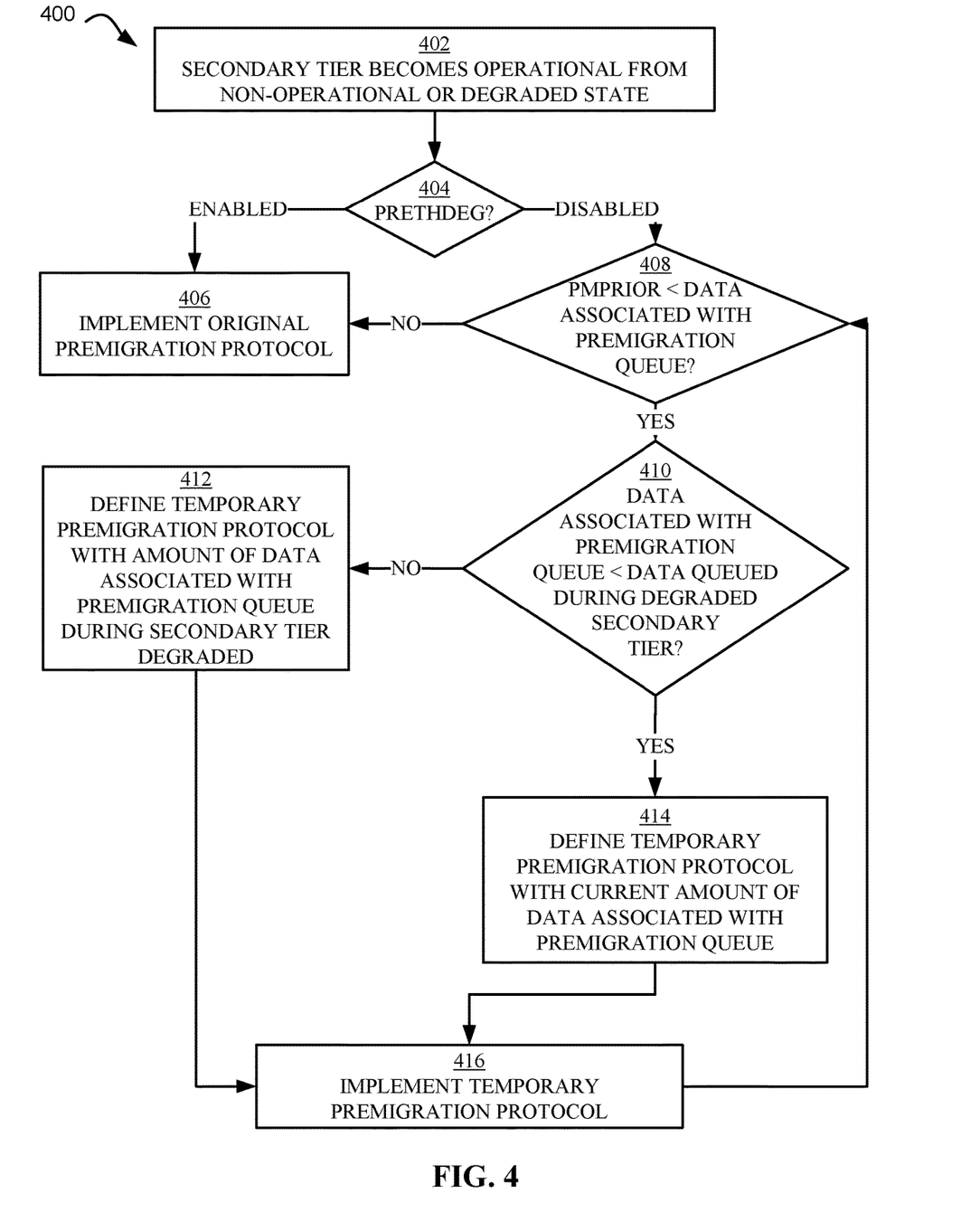
FIG. 4 illustrates a flowchart of an example method for modifying and updating a premigration protocol in accordance with some embodiments of the present disclosure.

FIG. 4 illustrates a flowchart of an example method for modifying and/or updating a premigration protocol in accordance with some embodiments of the present disclosure. In various embodiments, the method 400 can be executed by a processor executing instructions, or by a data manager such as data manager 104 of FIG. 1. For clarity, the method 400 will be described as being performed by a data manager, however, the method 400 can likewise be executed by alternative configurations of one or more hardware components.

In operation 402, the data manager determines a secondary tier becomes operational from a non-operational or degraded state.

In operation 404, the data manager determines if a "premigration throttling on physical library degraded" (PRETHDEG) function is enabled or disabled. The PRETHDEG function allows a user to disable (e.g., by disabling the PRETHDEG function) the premigration priority level and the premigration throttling level until the secondary tier returns to an operational state. The PRETHDEG function advantageously allows a tiered data storage system to operate in host peak write mode while the secondary tier is non-operational. This avoids useless throttling (e.g., if the PRETHDEG function were enabled and the premigration queue exceeded the premigration throttling threshold, then the tiered data storage system would transition to premigration throttling mode and delay host writes to the primary tier even though the tiered data storage would be unable to use the excess computational resources to transfer data from the primary tier to the secondary tier because of the degraded functionality of the secondary tier).

If the PRETHDEG function is enabled, the data manager proceeds to operation 406 and implements the original premigration protocol. Namely, the data manager implements the original premigration priority level, the original premigration throttling level, the original maximum amount of data associated with the premigration queue, and/or the original premigration throttling slope in operation 406.

If the PRETHDEG function is disabled, the data manager proceeds to operation 408 and determines if an amount of data in a premigration queue of the primary tier is larger than the original premigration priority level (PMPRIOR). If the amount of data associated with the premigration queue is less than the original premigration priority level, then the data manager proceeds to operation 406 and implements the original premigration protocol.

If the amount of data associated with the premigration queue is larger than the original premigration priority level, then the data manager proceeds to operation 410 and determines if the amount of data associated with the premigration queue is less than the amount of data queued during the degraded secondary tier.

If the amount of data queued during the degraded secondary tier is larger than the amount of data associated with the premigration queue, then the data manager proceeds to operation 414 and defines at least one of a temporary premigration priority level and a temporary premigration throttling level based on the current amount of data associated with the premigration queue.

In some embodiments, in operation 414 the data manager defines a temporary premigration priority level as the sum of the original premigration priority level and the current amount of data associated with the premigration queue. In some embodiments, in operation 414 the data manager defines a temporary premigration throttling level as the sum of the original premigration throttling level and the current amount of data associated with the premigration queue.

In some embodiments, in operation 414 the data manager further defines a temporary premigration throttling slope and a temporary maximum amount of data associated with the premigration queue. The temporary maximum amount of data associated with the premigration queue can be the modified premigration throttling level plus the original maximum amount of data associated with the premigration queue minus the original premigration throttling level. In some embodiments, the modified premigration throttling slope can be defined as a line connecting a first point defined at the temporary premigration throttling level on an x-axis and zero premigration throttle on a y-axis, and a second point defined by the temporary maximum amount of data associated with the premigration queue on the x-axis and the maximum premigration throttle on the y-axis.

Returning again to operation 410, if the data manager determines that the data queued during the degraded secondary tier is less than the data associated with the premigration queue, then the data manager proceeds to operation 412. In operation 412 the data manager defines a temporary premigration priority level and a temporary premigration throttling level. In some embodiments, the temporary premigration priority level defined in operation 412 comprises the sum of the amount of data queued during the degraded secondary tier plus the original premigration priority level. In some embodiments, the temporary premigration throttling level comprises the sum of the original premigration throttling level and the amount of data queued during the degraded secondary tier.

In some embodiments, in operation 412 the data manager further defines a temporary premigration throttling slope. The temporary premigration throttling slope can be a line defined by two points, where the first point comprises the temporary premigration throttling level on an x-axis and a zero premigration throttle value on a y-axis, and where the second point comprises a temporary maximum amount of data associated with the premigration queue on the x-axis and a maximum premigration throttle on the y-axis. In some embodiments, the temporary maximum amount of data associated with the premigration queue is the result of the temporary premigration throttling level plus the original maximum amount of data associated with the premigration queue minus the original premigration throttling level.

After completing either operation 412 or operation 414, the data manager proceeds to operation 416 and implements the temporary premigration protocol. The data manager iterates again to operation 408 to determine if the data associated with the premigration queue is greater than the original premigration priority level. For every iteration where the data manager determines the data associated with the premigration queue is greater than the original premigration priority level, the data manager can update the temporary premigration protocol in operations 410 and 414 (using the current amount of data associated with the premigration queue) and implement the updated temporary premigration protocol in operation 416. Thus, operation 410 ensures each iteration of updated temporary premigration protocol is less than or equal to the first temporary premigration protocol.

The data manager can proceed to operation 408 from operation 416 every predetermined time interval. For example, the data manager can wait 30 seconds before returning to operation 408 from operation 416. In various embodiments, the data manager waits at most 30 seconds before returning to operation 408, or the data manager waits at least 30 seconds before returning to operation 408.

Figure 5:
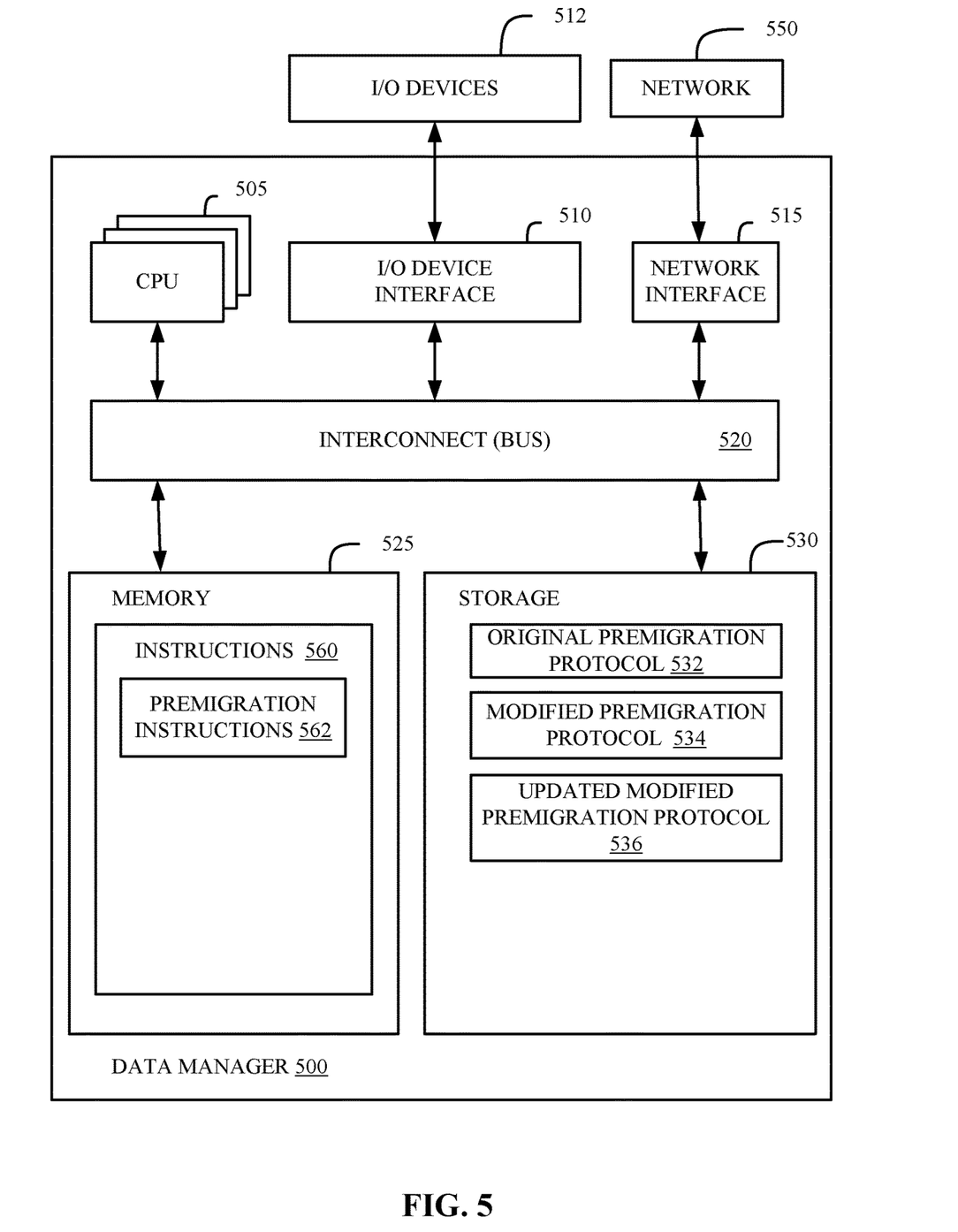
FIG. 5 illustrates a block diagram of a data manager in accordance with some embodiments of the present disclosure.

FIG. 5 illustrates a block diagram of a data manager 500 in accordance with some embodiments of the present disclosure. In some embodiments, data manager 500 is consistent with data manager 104 of FIG. 1. Data manager 500 can implement various premigration protocols of a tiered storage system such as premigration protocols illustrated in FIG. 3. In various embodiments, data manager 500 can perform, or provide executable instructions for the performance of, the methods described in FIGS. 2 and 4.

The data manager 500 can include a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, or flash memory devices. In an alternative embodiment, the storage 530 can be replaced by storage area-network (SAN) devices, the cloud, or other devices connected to the data manager 500 via the I/O devices interface 510 or a network 550 via the network interface 515.

In some embodiments, the memory 525 stores instructions 560 and the storage 530 stores original premigration protocol 532, the modified premigration protocol 534, and one or more updated modified premigration protocol(s) 536. However, in various embodiments, the instructions 560, original premigration protocol 532, modified premigration protocol 534, and updated modified premigration protocol(s) 536 are stored partially in memory 525 and partially in storage 530, or they are stored entirely in memory 525 or entirely in storage 530, or they are accessed over a network 550 via the network interface 515.

The original premigration protocol 532 can comprise at least one of an original premigration priority level, an original premigration throttling level, an original maximum amount of data associated with the premigration queue, an original premigration throttling slope, and an original maximum throttle level.

The modified premigration protocol 534 can comprise at least one of a modified premigration priority level, a modified premigration throttling level, a modified maximum amount of data associated with the premigration queue, a modified premigration throttling slope, and an original maximum throttle level or a modified maximum throttle level.

The updated modified premigration protocol 536 can comprise at least one updated modified premigration protocol. Each updated modified premigration protocol can comprise at least one of an updated modified premigration priority level, an updated modified premigration throttling level, an updated modified maximum amount of data associated with the premigration queue, an updated modified premigration throttling slope, and an original maximum throttle level or an updated modified maximum throttle level.

The instructions 560 are processor executable instructions including premigration instructions 562. Premigration instructions 562 can include instructions to execute the methods shown in FIGS. 2 and 4, to generate the graph shown in FIG. 3, and to generate and/or implement the original premigration protocol 532, the modified premigration protocol 534, and/or one or more updated modified premigration protocol(s) 536.

In various embodiments, the I/O devices 512 can include an interface capable of presenting information and receiving input. For example, I/O devices 512 can present information to a user interacting with data manager 500 and receive input from a user.

Data manager 500 is connected to the network 550 via the network interface 515. In some embodiments, network 550 is consistent with network 150 of FIG. 1.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any subset of the methods described with respect to FIGS. 2 and 4) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   in response to a secondary tier of a hierarchical data storage system returning to an operational state from a degraded state, wherein a mode of the hierarchical data storage system is host peak write mode, and further in response to an amount of data associated with a premigration queue associated with a primary tier of the hierarchical data storage system exceeding an original throttling threshold associated with an original premigration throttling protocol:
      maintaining the hierarchical data storage system using a dynamic premigration throttling protocol associated with a dynamic throttling threshold that is greater than the original throttling threshold, and wherein the dynamic throttling threshold decreases when the amount of data associated with the premigration queue decreases below the dynamic throttling threshold;
   in response to maintaining the hierarchical data storage system using the dynamic premigration throttling protocol, and in response to the amount of data in the premigration queue being less than the original throttling threshold, maintaining the hierarchical data storage system using the original premigration throttling protocol, wherein:
      the original throttling threshold indicates an original amount of data associated with the premigration queue at which the hierarchical data storage system performs premigration operations;
      the dynamic premigration throttling protocol comprises delaying writing respective portions of data to the primary tier by a delay time that is proportional to an excessive amount of data associated with the premigration queue in excess of the dynamic throttling threshold; and
      changing the mode of the hierarchical data storage system from the host peak write mode to a premigration priority mode in response to the amount of data associated with the premigration queue exceeding a priority level, wherein the dynamic premigration throttling protocol comprises the priority level.

2. The method of claim 1, wherein an initial value of the dynamic throttling threshold comprises a sum of the original throttling threshold and an accumulated amount of data that accumulates in the premigration queue while the secondary tier is in the degraded state.

3. The method of claim 1, wherein an initial value of the dynamic throttling threshold comprises a sum of the original throttling threshold and a current amount of data associated with the premigration queue.

4. The method of claim 1, wherein an initial value of the dynamic throttling threshold comprises a sum of the original throttling threshold and an accumulated amount of data that accumulates in the premigration queue while the secondary tier is in the degraded state.

5. The method of claim 1, wherein an initial value of the dynamic throttling threshold comprises a sum of the original throttling threshold and a current amount of data associated with the premigration queue.

6. The method of claim 1, further comprising:
   in response to the amount of data associated with the premigration queue exceeding the dynamic throttling threshold, delaying respective portions of data being written to the primary tier and transferring respective portions of the amount of data associated with the premigration queue from the primary tier to the secondary tier.

7. The method of claim 1, wherein the primary tier comprises a disk storage system, and wherein the secondary tier comprises a tape storage system.

8. A hierarchical data storage system comprising:
a data manager communicatively coupled to a primary tier of the hierarchical data storage system, wherein a mode of the hierarchical data storage system is host peak write mode, a premigration queue associated with the primary tier of the hierarchical data storage system, and a secondary tier of the hierarchical data storage system, the data manager comprising a processor and a non-transitory computer-readable storage medium storing instructions which, when executed by the processor, cause the processor to perform a method comprising:
  in response to the secondary tier returning to an operational state from a degraded state, and further in response to an amount of data associated with the premigration queue associated with the primary tier exceeding an original throttling threshold associated with an original premigration throttling protocol:
    maintaining the hierarchical data storage system using a dynamic premigration throttling protocol associated with a dynamic throttling threshold that is greater than the original throttling threshold, and wherein the dynamic throttling threshold decreases when the amount of data associated with the premigration queue decreases below the dynamic throttling threshold;
  in response to maintaining the hierarchical data storage system using the dynamic premigration throttling protocol, and in response to the amount of data associated with the premigration queue being less than the original throttling threshold, maintaining the hierarchical data storage system using the original premigration throttling protocol, wherein:
    the original throttling threshold indicates an original amount of data associated with the premigration queue at which the hierarchical data storage system performs premigration operations;
    the dynamic premigration throttling protocol comprises delaying writing respective portions of data to the primary tier by a delay time that is proportional to an excessive amount of data associated with the premigration queue in excess of the dynamic throttling threshold; and
    changing the mode of the hierarchical data storage system from the host peak write mode to a premigration priority mode in response to the amount of data associated with the premigration queue exceeding a priority level, wherein the dynamic premigration throttling protocol comprises the priority level.

9. The hierarchical data storage system of claim 8, wherein an initial value of the dynamic throttling threshold comprises a sum of the original throttling threshold and an accumulated amount of data that accumulates in the premigration queue while the secondary tier is in the degraded state.

10. The hierarchical data storage system of claim 8, wherein an initial value of the dynamic throttling threshold comprises a sum of the original throttling threshold and a current amount of data associated with the premigration queue.

11. The hierarchical data storage system of claim 8, wherein an initial value of the dynamic throttling threshold comprises a sum of the original throttling threshold and an accumulated amount of data that accumulates in the premigration queue while the secondary tier is in the degraded state.

12. The hierarchical data storage system of claim 8, wherein an initial value of the dynamic throttling threshold comprises a sum of the original throttling threshold and a current amount of data associated with the premigration queue.

13. The hierarchical data storage system of claim 8, further comprising:
  in response to the amount of data associated with the premigration queue exceeding the dynamic throttling threshold, delaying respective portions of data being written to the primary tier and transferring respective portions of the amount of data associated with the premigration queue from the primary tier to the secondary tier.

14. The hierarchical data storage system of claim 8, wherein the primary tier comprises a disk storage system, and wherein the secondary tier comprises a tape storage system.

15. A computer program product comprising a computer readable storage medium having program instructions embodied therewith, wherein the computer readable storage medium is not a transitory signal per se, the program instructions executable by a processor to cause the processor to perform a method comprising:
  in response to a secondary tier of a hierarchical data storage system returning to an operational state from a degraded state, wherein a mode of the hierarchical data storage system is host peak write mode, and further in response to an amount of data associated with a premigration queue associated with a primary tier of the hierarchical data storage system exceeding an original throttling threshold associated with an original premigration throttling protocol:
    maintaining the hierarchical data storage system using a dynamic premigration throttling protocol associated with a dynamic throttling threshold that is greater than the original throttling threshold, and wherein the dynamic throttling threshold decreases when the amount of data associated with the premigration queue decreases below the dynamic throttling threshold;
  in response to maintaining the hierarchical data storage system using the dynamic premigration throttling protocol, and in response to the amount of data associated with the premigration queue being less than the original throttling threshold, maintaining the hierarchical data storage system using the original premigration throttling protocol, wherein:
    the original throttling threshold indicates an original amount of data associated with the premigration queue at which the hierarchical data storage system performs premigration operations;
    the dynamic premigration throttling protocol comprises delaying writing respective portions of data to the primary tier by a delay time that is proportional to an excessive amount of data associated with the premigration queue in excess of the dynamic throttling threshold; and
    changing the mode of the hierarchical data storage system from the host peak write mode to a premigration priority mode in response to the amount of data associated with the premigration queue exceeding a priority level, wherein the dynamic premigration throttling protocol comprises the priority level.

16. The computer program product of claim 15, wherein an initial value of the dynamic throttling threshold comprises a sum of the original throttling threshold and an accumulated amount of data that accumulates in the premigration queue while the secondary tier is in the degraded state.

17. The computer program product of claim 15, wherein an initial value of the dynamic throttling threshold comprises a sum of the original throttling threshold and a current amount of data associated with the premigration queue.

18. The computer program product of claim 15, wherein an initial value of the dynamic throttling threshold comprises a sum of the original throttling threshold and an accumulated amount of data that accumulates in the premigration queue while the secondary tier is in the degraded state.

19. The computer program product of claim 15, wherein an initial value of the dynamic throttling threshold comprises a sum of the original throttling threshold and a current amount of data associated with the premigration queue.

20. The computer program product of claim 15, further comprising:
    in response to the amount of data associated with the premigration queue exceeding the dynamic throttling threshold, delaying respective portions of data being written to the primary tier and transferring respective portions of the amount of data associated with the premigration queue from the primary tier to the secondary tier.

* * * * *